(12) United States Patent
Barmore

(10) Patent No.: US 9,683,756 B2
(45) Date of Patent: Jun. 20, 2017

(54) MODULAR, FLUID THERMAL TRANSFER DEVICE

(75) Inventor: Robert P. Barmore, Portsmouth, NH (US)

(73) Assignee: THERMA-HEXX, Corporation, Portsmouth, NH (US)

(*) Notice: Subject to any disclaimer, the term of this patent is extended or adjusted under 35 U.S.C. 154(b) by 289 days.

(21) Appl. No.: 14/116,320

(22) PCT Filed: May 22, 2012

(86) PCT No.: PCT/US2012/039008
§ 371 (c)(1),
(2), (4) Date: Nov. 7, 2013

(87) PCT Pub. No.: WO2012/162322
PCT Pub. Date: Nov. 29, 2012

(65) Prior Publication Data
US 2014/0096763 A1    Apr. 10, 2014

Related U.S. Application Data

(63) Continuation-in-part of application No. 13/117,098, filed on May 26, 2011, now Pat. No. 8,944,146.

(51) Int. Cl.
*F24J 2/04* (2006.01)
*F24D 3/12* (2006.01)
(Continued)

(52) U.S. Cl.
CPC ........... *F24J 2/0422* (2013.01); *E04B 9/0421* (2013.01); *E04B 9/0464* (2013.01); *E04C 2/525* (2013.01);
(Continued)

(58) Field of Classification Search
CPC ........ F24J 2/0422; F24J 2/0438; F24J 2/0483; F24J 2/20; F24J 2/204; F24J 2/22
(Continued)

(56) References Cited

U.S. PATENT DOCUMENTS 4,306,616 A    12/1981 Woods
4,326,366 A *   4/1982 Werner ................... F24D 3/142
                                                52/220.3
(Continued)

FOREIGN PATENT DOCUMENTS

JP          10253086       9/1998
JP         2000130779      5/2000
(Continued)

OTHER PUBLICATIONS

International Search Report and Written Opinion for PCT/US2012/039008 mailed Dec. 26, 2012.

*Primary Examiner* — Alissa Tompkins
*Assistant Examiner* — Nathaniel Herzfeld
(74) *Attorney, Agent, or Firm* — Workman Nydegger

(57) ABSTRACT

A modular thermal panel can include a heat exchanger having connected top and bottom plates with channels formed there between for receiving a heat exchange fluid. An architectural tile (e.g., a paver, stone, acoustic tile, or any other architectural element) can rest on the top of the modular thermal panel, while an insulator panel is positioned below the modular thermal panel. The heat exchanger can transfer heat between the architectural tile and the heat exchange fluid to either cool or heat the architectural panel. Additional implementations include heat transfer systems including such modular thermal panels, and methods of collecting and utilizing thermal energy using such modular thermal panels.

27 Claims, 10 Drawing Sheets

(51) Int. Cl.
*E04B 9/04* (2006.01)
*E04C 2/52* (2006.01)
*F24D 3/14* (2006.01)
*F24D 3/16* (2006.01)

(52) U.S. Cl.
CPC .............. *F24D 3/122* (2013.01); *F24D 3/125* (2013.01); *F24D 3/127* (2013.01); *F24D 3/14* (2013.01); *F24D 3/142* (2013.01); *F24D 3/16* (2013.01); *F24J 2/0438* (2013.01); *Y02B 10/20* (2013.01); *Y02E 10/44* (2013.01)

(58) Field of Classification Search
USPC ........................................................ 126/714
See application file for complete search history.

(56) References Cited

U.S. PATENT DOCUMENTS

| | | | | |
|---|---|---|---|---|
| 4,508,162 A * | 4/1985 | Radtke | ............. | E04F 15/02405 165/49 |
| 4,553,587 A | 11/1985 | Traylor | | |
| 4,611,577 A * | 9/1986 | Clegg | ............. | F24J 2/20 126/588 |
| 4,750,556 A * | 6/1988 | del Valle P. | ............. | B01J 8/087 165/109.1 |
| 4,865,120 A * | 9/1989 | Shiroki | ............. | F24D 11/002 165/171 |
| 5,240,179 A * | 8/1993 | Drinkwater | ............. | E03B 7/12 137/59 |
| 6,533,186 B2 * | 3/2003 | Neve | ............. | G05D 23/1931 165/56 |
| 6,899,169 B1 | 5/2005 | Cox | | |
| 8,295,035 B2 * | 10/2012 | Collier | ............. | E04F 15/02458 174/250 |
| 2003/0163965 A1 * | 9/2003 | Hydock | ............. | F24D 3/142 52/342 |
| 2004/0251011 A1 | 12/2004 | Kudo | | |
| 2006/0107618 A1 | 5/2006 | Hydock | | |
| 2010/0154216 A1 * | 6/2010 | Hulen | ............. | E01C 11/26 29/890.033 |
| 2010/0224234 A1 * | 9/2010 | Fischer | ............. | F24D 11/0221 136/248 |
| 2012/0324923 A1 * | 12/2012 | Kim | ............. | F24D 3/18 62/79 |
| 2014/0308076 A1 | 10/2014 | Tabibnia | | |

FOREIGN PATENT DOCUMENTS

| | | |
|---|---|---|
| WO | 03322349 | 11/2003 |
| WO | 2006064531 | 6/2006 |
| WO | 2010150086 | 12/2010 |

* cited by examiner

MODULAR, FLUID THERMAL TRANSFER DEVICE

CROSS-REFERENCE TO RELATED APPLICATIONS

The present application is a 35 U.S.C. §371 U.S. National Stage of PCT Application No. PCT/US2012/039008 filed May 22, 2012, entitled, "MODULAR, FLUID THERMAL TRANSFER DEVICE," which claims priority to U.S. patent application Ser. No. 13/117,098, filed May 26, 2011, entitled "MODULAR, FLUID THERMAL TRANSFER DEVICE." The entire contents of each of the aforementioned patent applications is incorporated by reference herein.

BACKGROUND OF THE INVENTION

1. Technical Field

The present invention relates to apparatus, systems, and methods for transferring thermal energy. More particularly, implementations of the present invention relate to apparatus, systems, and methods for transferring thermal energy between an object and a fluid contained and transited within a heat exchanger. More specifically, one or more implementations of the present invention relate to a modular heat exchange panels that can be easily connected and disconnected with other modular heat exchange panels to form an array of modular heat exchange panel. Modular heat exchange panels of one or more implementations can transfer solar generated heat on a flat surface, such as a roof top patio, to heat domestic water or a pool, while concurrently, cooling the flat surface. Still further, modular heat exchange panel panels of one or more implementations can transfer heat to the surface (e.g., patio) for the purpose of melting snow and ice on the surface.

2. Background and Relevant Art

The transfer of thermal energy between thermal mass objects, such as concrete or stone, and fluid within tubes is a conventional method of radiant heating, solar heat collection, and/or thermal mass cooling. Typically, conventional thermal transfer systems include some form or type of round tubing to contain and circulate the fluid. One common type of tubing in use currently is known as cross linked polyethylene or PEX. Conventional thermal transfer systems often include PEX tubing embedded in a concrete slab or fastened underneath a floor. These conventional thermal transfer systems circulate fluid through the tubes to cause thermal transfer between the fluid and tubes, and subsequently, the tubes and the adjacent mass.

Unfortunately, such conventional thermal transfer systems typically include one or more limitations. For example, conventional thermal transfer systems are typically not compatible with, and thus cannot join directly to, pre-formed paver or slab units, such as paver slab units elevated on pedestals. Furthermore, conventional thermal transfer systems often require a continuous monolithic mass to contain the tubes and are difficult to repair. Conventional thermal transfer systems also often do not allow for disassembly, re-assembly, or other rearranging of an initial configuration.

Also, conventional thermal transfer systems typically have manufacturing limits of continuous extruded tubing having an interior surface that is smooth and linear. Such tubing causes the fluid to flow linearly through the smooth round tubes. Such linear flow can lead to inefficiency in the transfer of thermal energy between the fluid and tube surface due to a boundary layer that is created by the linearly flowing fluid.

Additionally, the long continuous runs of tubing can expand and contract causing ticking and clicking noises within the system. Also, upon deterioration of the concrete slab that encases the tubing, conventional thermal transfer systems require replacement of the slab as well as the tubing due to damage to the tubing often created during the demolition of the concrete slab. The constant expansion and contraction of the tubing in conventional thermal transfer systems accelerates the deterioration of the concrete slab causing premature failure of the concrete. Along related lines, if the tubing is subject to freezing without the proper anti freeze in the fluid, failure of the tubing can result, thus necessitating the demolition/replacement of the concrete slab in order to repair the tubing.

In addition to the foregoing, limitations of current pipe or tube connectors can compound the drawback of conventional thermal transfer systems. Conventional pipe or tube connectors include, but are not limited to, push-on-type utilizing O-rings, glue-on-type, and compression-type connectors. When removed, conventional compression type connectors often leave a mark or deformation on the surface of the tube that they were locked onto. Such deformations can cause leakage when the tube is reconnected. As such, conventional compression-type connectors are often unsatisfactory for re-uses and systems that require connection and disconnection of tubes (such as modular or reconfigurable systems).

Conventional glue-on-type connectors often require more time to install and have a potential to leak. Furthermore, when conventional glue-on-type connectors do leak they typically cannot be replaced. Conventional glue-on-type connectors also commonly do not allow for disassembly reassembly. In addition to the foregoing, conventional glue-on-type connectors are typically limited to use with materials that are suitable for gluing.

Conventional push-on-type O-ring connectors are more are suitable for modular connections due to the ability to remove and replace them at will, their ability to be flexed and rotated without leaking, and their ability to allow for expansion and contraction in the joint. Nonetheless, conventional push-on-type O-ring connectors also present some limitations.

In addition to the foregoing, conventional thermal transfer systems commonly do not allow for nesting with paver/slabs that are raised on pedestals. Conventional thermal transfer systems also often do not allow for easy disassembly and reassembly without causing damage to the components. Still further conventional thermal transfer systems often utilize connecters that leak or are otherwise faulty. Additionally, conventional thermal transfer systems are not practical or economical to manufacture in modular form.

Accordingly, there are a number of disadvantages with conventional thermal transfer systems that can be addressed.

BRIEF SUMMARY OF THE INVENTION

Implementations of the present invention solve one or more of the aforementioned or other problems in the art with systems, methods, and apparatus that create many new opportunities for the use of thermal transfer between fluids and an object. In particular, one or more implementations include modular thermal transfer panels with simple, yet efficient designs. In one or more implementations, the modular thermal panels can function as invisible solar collectors, radiant heating and cooling devices, or acoustic panels The modularity of the thermal transfer devices allows for a number of benefits. For example, the modularity of the thermal transfer devices allows for the manufacture of devices to match a particular size paver/slab/stone unit. The modularity also allows the thermal transfer devices to be arrayed with other paver/slab/stone units creating a highly efficient transfer of thermal energy between a fluid and a thermal mass. In addition to the foregoing, the modular thermal transfer devices allow for disassembly and re-assembly of an array of modular thermal transfer devices. The ability to disassemble the device can allow for repairs to the system, replacement of damaged or broken paver/slabs, or easy access to the area below a paver surface. Still further, the modularity of the thermal transfer devices can allow devices to be removed and replaced without having to remove an entire array.

For example, one implementation of a modular thermal panel includes a heat exchanger having a first panel connected to a second panel. The first panel is configured to abut an architectural tile. The modular thermal panel also includes a plurality of channels defined by and located between the first panel and the second panel. The plurality of channels allows a heat exchange fluid to pass between the first and second panels and transfer heat to or from the architectural tile. The modular thermal panel further including an inlet tube having first and second ends, and an outlet tube having first and second ends. The first end of the inlet tube is coupled to an inlet of the plurality of channels of the heat exchanger. Also, the first end of the outlet tube is coupled to an outlet of the plurality of channels. The inlet tube and the outlet tube are curved in a shape so the second ends of the inlet and outlet tubes are oriented at an angle to the inlet and outlet of the plurality of channels.

Another implementation of a modular thermal panel includes a thermal mass unit, such as a paver, having a top and bottom surface. The modular thermal panel also includes a heat exchanger having connected top and bottom panels with channels formed there between for receiving a heat exchange fluid. The top panel of the heat exchanger is coupled to the bottom surface of the paver. Additionally, the modular thermal panel includes an insulator panel coupled to the bottom panel of the heat exchanger. Inlet and outlet tubes are coupled to the heat exchanger for feeding heat exchange fluid to and from the heat exchanger. The size of the heat exchanger is equal to the size of the thermal mass unit and the edges of the heat exchanger are aligned with the edges of the thermal mass unit. The heat exchanger is made of thermally transmissive material including one or more of polymers, stainless steel, aluminum or copper. The thermal mass unit is made of a material which includes modular or formed in place concrete, cement, gypsum concrete, gypsum, metal, or stone.

An implementation of a heat transfer system includes a plurality of roll bonded heat exchangers. Each heat exchanger of the plurality of roll bonded heat exchangers includes first and second panels intermittently secured together to define a plurality of channels therebetween. Each heat exchanger further includes an inlet and an outlet to the plurality of channels located near the center of the first and second panels. The system also includes a plurality of architectural tiles positioned on the first panels of the plurality of heat exchangers so as to conceal the plurality of heat exchangers from view. Additionally, the system includes a heat exchange fluid configured to circulate through the plurality of channels of the plurality of heat exchangers to transfer heat between the heat exchange fluid and the plurality of architectural tiles.

In addition to the foregoing, a method of collecting and utilizing thermal energy involves positioning a plurality of heat exchangers across a surface and interconnecting the plurality of heat exchangers together. Each heat exchanger of the plurality of heat exchangers includes first and second panels intermittently secured together to define a plurality of channels therebetween. Each heat exchanger also includes an inlet and an outlet to the plurality of channels located near the center of the first and second panels. The method also involves positioning a plurality of architectural tiles on the first panels of the plurality of heat exchangers so as to conceal the plurality of heat exchangers from view. Furthermore, the method involves circulating a heat exchange fluid through the plurality of channels of the plurality of heat exchangers thereby causing heat to transfer between the plurality of architectural tiles and the heat exchange fluid.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

One or more implementations of the present invention are directed to systems, methods, and apparatus that create many new opportunities for the use of thermal transfer between fluids and a thermal mass. In particular, one or more implementations include modular thermal transfer panels with simple, yet efficient designs. In one or more implementations, the modular thermal panels can function as invisible solar collectors.

Implementations of the present invention can include modular thermal panels made of thermal conductive material (e.g., aluminum) with channels formed inside. One or more thermal masses (i.e., an architectural tile) can cover the thermal panels. A thermal exchange fluid circulating through the channels can absorb from or transfer heat to the architectural tiles.

Modular thermal panels of the present invention can have various different uses. For example, it is common for flat roofed buildings, plazas and patios to have paver/slabs installed on pedestals or in direct contact with the ground. These pavers can get very hot and create urban heat islands and heating the atmosphere above the buildings, creating higher temperatures in the environment. Certain municipalities require the use of "cool roofs" to lower the incidence of urban heat islands.

In one or more implementations, modular thermal panels placed under a rooftop, plaza, or patio application can collect heat accumulated in the paver/slabs and transfer the thermal energy into the domestic hot water system of the building. Thus, simultaneously cooling the roof top patio, plaza or patio while lowering the effect of the urban heat island. In the winter, the modular thermal panels can melt any accumulated snow on the surface of the paver/slabs by reversing the thermal transfer process. In further implementations, the modular thermal panels can form part of a geo-thermal loop to remove excessive heat from thermal masses in hot climates and to transfer heat to the thermal mass in cold climates. Thus, thus making the paver/slab system compatible with alternative energy sources.

Further implementations of the present invention can include modular thermal panels integrated with photovoltaic ("PV") system. The modular thermal panels can collect thermal energy to cool down the PV cells in summer. Cooling down the PV cells can increase the efficiency of PV cells. In winter, the modular thermal panels can melt snow covering the PV cells. Still another use of the modular thermal panels is as heating or cooling source in a floor, wall, or ceiling. For example, a chilled fluid running through the modular thermal panels can cool the architectural tiles and create a comfortable walking surface in very hot climates.

Figure 1:
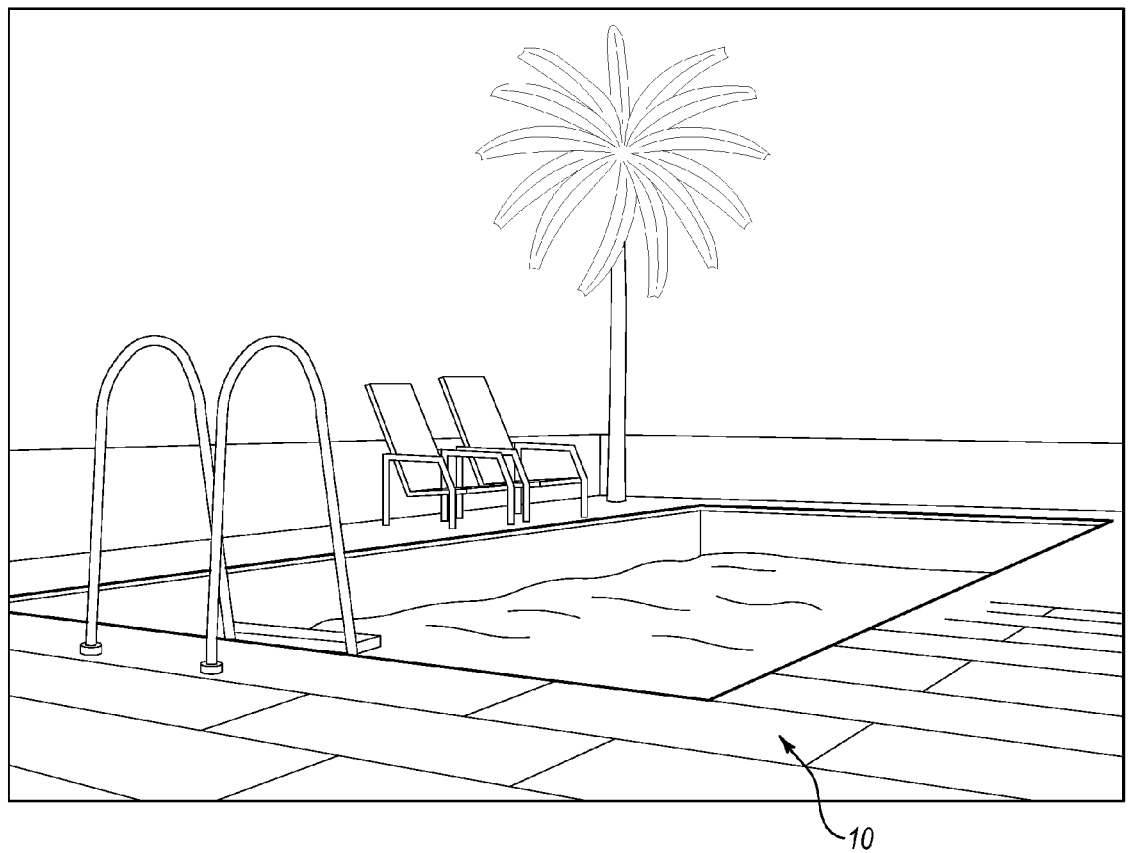
FIG. 1 illustrates a view of thermal panels in accordance with one or more implementations of the present invention on a roof top patio of a high rise building where the heat from the sun is absorbed by the panels and is used to heat the water in the pool.

One will appreciate in light of the disclosure herein that the modular thermal panels of one or more implementations can have various different useful applications. Referring now to FIG. 1, one such application will be described in detail. In particular, FIG. 1 illustrates a plurality of modular thermal panels 10 arranged in rows and columns on a roof top patio of a high rise building. The modular thermal panels 10 can absorb heat from the sun to heat a fluid, such as the swimming pool shown in FIG. 1.

Thus, the modular thermal panels 10 can collect solar heat energy when placed on balconies, terraces, low sloping roofs, plazas, sidewalks, patios, roof top patios, and pool patios. The collected energy can heat domestic water, pool water, of stored water for future heating. The removal of the heat from the architectural tiles covering the modular thermal panels 10 can help to cool the surface making for a more comfortable and usable environment.

Figure 2:
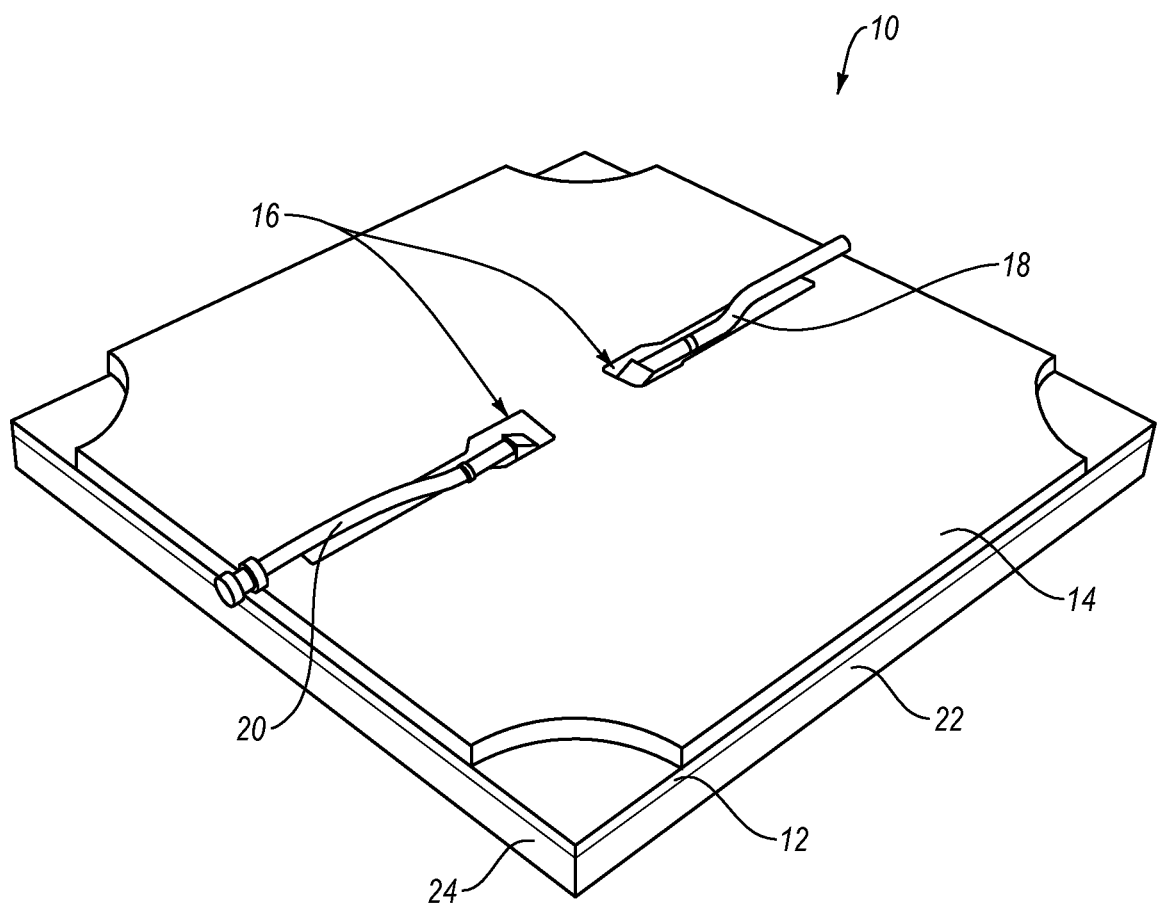
FIG. 2 is a perspective view of the bottom of a single thermal panel in accordance with one or more implementations of the present invention.

FIG. 2 illustrates a bottom view of a modular thermal panel 10 in accordance with an implementation of the present invention. As shown by FIG. 2, the modular thermal panel 10 can comprise a heat exchanger 12. Optionally, the modular thermal panel 10 can comprise an insulator panel (e.g., a sheet of insulation) 14 located on the bottom of the heat exchanger 12. In one or more implementations, the insulator panel 14 is attached to the heat exchanger 12 by friction, adhesive, mechanical attachment, over molding, or another form of attachment. In alternative implementations, the insulator panel 14 can simply reside under the heat exchanger 12.

The insulator panel 14 can comprise one or more insulating materials, such as, for example, polyfoam, expanded or extruded polystyrene, icynene, urethane, or isocyanurate. In one or more implementations, the insulator panel 14 can be impervious to water infiltration and insect infestation. The insulator panel can also provide rigidity to the heat exchanger 12. The thickness of the insulator panel 14 can vary depending upon the material and the location of use of the modular thermal panel 10. In any event, the insulator panel 14 can prevent unnecessary heat exchange or loss from the bottom of the heat exchanger 12. Thus, the insulator panel 14 can help keep thermal energy concentrated between the heat exchanger 12 and an architectural tile.

In one or more implementations, the insulator panel 14 can include cutouts to allow an inlet tube 18 and an outlet tube 20 to couple directly to the heat exchanger 12. The insulator panel 14 can also include removable corners. For example, FIG. 2 shows an insulator panel 14 without corners. The removable corners can expose portions of the bottom of the heat exchanger 12, which can in turn rest upon pedestals, as described in greater detail below.

The modular thermal panel 10 can also optionally include a membrane interface 22 on the top surface of the heat exchanger 12. The membrane interface 22 can comprise a sheet or layer of thermal conductive material placed between the heat exchanger 12 and the architectural tile 24. For example, the membrane interface 22 can comprise a thermal mastic material that is a non-hardening, paste that has excellent thermal transfer properties. In alternative implementations, the membrane interface 22 can comprise rubberized asphalt. In still further implementations, the membrane interface 22 can comprise metal fibers or metal wool to form an acoustic absorbing layer while allowing for heat conductance between the heat exchanger and an acoustic tile.

The membrane interface 22 can fill gaps between the top surface of the heat exchanger 12 and the architectural tile 24 for the purpose of increasing the thermal transfer efficiency between the heat exchanger 12 and the architectural tile 24. In addition to the foregoing, the membrane interface 22 can also increase the friction between the heat exchanger 12 and the architectural tile 24. The increased friction can prevent or reduce shifting between the heat exchanger 12 and the architectural tile 24 when placed below a drive way or other high traffic surface. Reducing shifting between the heat exchanger 12 and the architectural tile 24 can prevent the architectural tile 24 from abrading the heat exchanger 12.

The architectural tile 24 can comprise a paver, slab, flagstone, roofing tile, wall stucco, bricks, natural stone, an acoustic ceiling tile, etc. The architectural tile 24 can comprise various materials, such as for example, concrete, poured concrete, pre-cast concrete, cement, sand natural stone, stucco, glass, ceramic, clay, metal, crushed stone, sand, gyperete, or aggregates etc. Thus, the architectural tiles 24 can comprise the outer surface of a patio, deck, sidewalk, driveway, roof, wall, ceiling, floor, or other surface. In one or more implementations, the architectural tiles 24 can comprise a two foot by two foot paver having a thickness of less than about three inches. In alternative implementations, the architectural tiles 24 can have an area or thickness greater or less than those mentioned above.

Figure 3A:
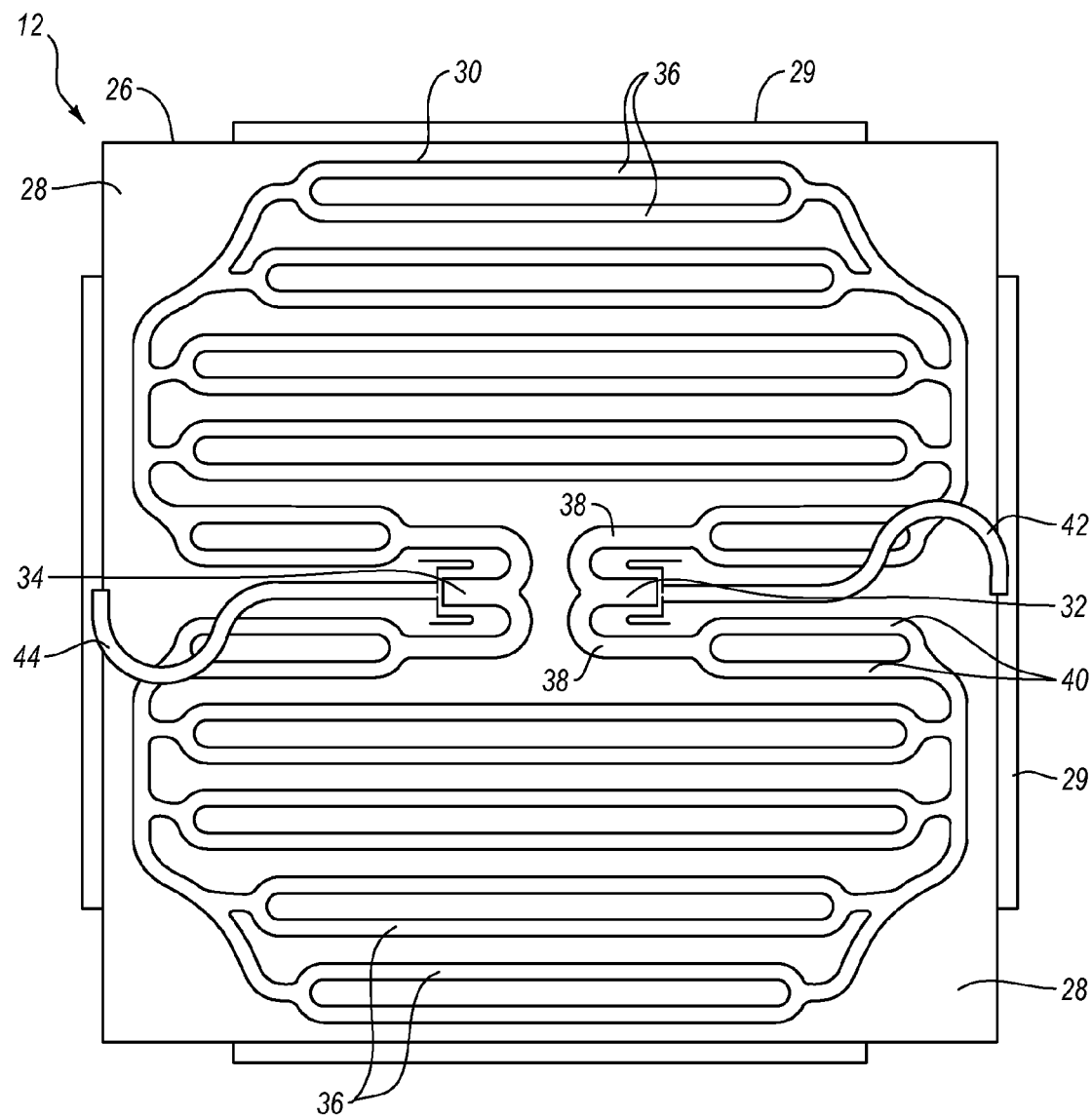
FIG. 3A is a bottom plan view of a roll bonded heat exchanger in accordance with one or more implementations of the present invention.

Referring now to FIG. 3A, a bottom view of the heat exchanger 12 is illustrated. The heat exchanger 12 can include a first or top panel 26 and a second or bottom panel 28. The heat exchanger can further include a plurality of channels 30 formed between the top panel 26 and the bottom panel 28. The panels 26, 28 of the heat exchanger can comprise a thermally conductive or transmissive material including, but not limited to, polymers, stainless steel, aluminum, or copper. Furthermore, the heat exchanger 12 can include a powder coating to darken the color(s) of the heat exchanger 12 or to change thermal exchange rate of the heat exchanger 12.

In one or more implementations, the heat exchanger 12 can have a size and/or shape substantially the same as an architectural tile 24 (e.g., paver) to be placed on the heat exchanger 12. In alternative implementations, the heat exchanger 12 can be smaller or larger than architectural tile(s) 24 (e.g., paver) to be placed on the heat exchanger 12. As shown by FIG. 3A, the heat exchanger 12 can have a square shape. In alternative implementations, the heat exchanger 12 can have a circular, rectangular, oval, or other shape.

In one or more implementations, the heat exchanger 12 is a roll-bonded heat exchanger. In such implementations, the first and second panels 26, 28 can define the channels 30. In particular, the second panel 28 can include the shape of the channels 30 stamped or otherwise formed therein. The portions of the second panel 28 that are not stamped can be bonded (i.e., roll-bonded) to the first panel 26. For example, as shown by FIG. 3A the portions of the second panel 28 between and surrounding the channels 30 are bonded to the first panel 26. Having channels 30 stamped only in the second or back panel 28 can allow the first or front panel 26 to have a flat, planar surface upon which an architectural tile 24 can rest. In alternative implementations, the first panel 26 can also include the shape of the channels 30 stamped or otherwise formed therein for increasing the fluid flow rate and lessening the pressure drop across the inlet and outlet.

In still further implementations, the heat exchanger 12 can comprise a third panel. For example, FIG. 3C illustrates a heat exchanger 12c configured an acoustic ceiling tile. The third panel 33 can comprise a decorative panel to provide the heat exchanger 12a with a desirable aesthetic. The third panel 33 can couple to the top of the first panel 26 by crimping, fasteners, a tongue and groove configuration, a snap-fit configuration, gravity, friction, an adhesive, or other fastening mechanism. The heat exchanger 12c can further include a thermally conductive material 35 between the first panel 26 and the third panel 33. The thermally conductive material 35 can comprise, for example, sand, metallic beads, or woven metallic material. The thermally conductive material 35 can be a sound dampening material that acts to absorb sound. In implementations in which the channels 30 are stamped in the first panel 26, the third panel 33 can provide a flat, planar surface upon which an architectural tile 24 can rest or be attached. One will appreciate that a heat exchanger 12c configured as a ceiling panel can provide a highly efficient way to heat and cool spaces.

Referring again to FIG. 3A, the heat exchanger 12 can further include tabs 29. The tabs 29 can extend along each edge of the heat exchanger 12. The tabs 29 can be perpendicular to the primary surfaces of the heat exchanger 12 and can have a width to prevent the heat exchanger 12 from sagging or bending under its own weight. Thus, the tabs 29 can help prevent the heat exchanger 12 from breaking contact with the bottom of an architectural tile (e.g., a paver) position above the heat exchanger 12. Furthermore, in one or more implementations, the tabs 29 can provide convenience in aligning multiple heat exchangers 12 together and preventing or reducing warping issues. Still further, the tabs 29 can have a curved or bended configuration. Alternatively, the tabs 29 can be planar.

In one or more implementations, the tabs 29 can completely surround the heat exchanger 12. In alternative implementations, the tabs 29 are held back from the corners of the heat exchanger 12, as shown by FIG. 4. Having tabs 29 that extend only partially around the heat exchanger 12 can allow for the placement of pedestals or corner alignment rings directly against the horizontal bottom plane of the heat exchanger 12. Thus, allowing for a lower height profile between the pedestal and the paver.

FIG. 3A further illustrates that the channels 30 can comprise an inlet 32 and an outlet 34. The inlet 32 and the outlet 34 each can each have a location spaced from the edges of the heat exchanger 12. For example, FIG. 3A illustrates an implementation in which both the inlet 32 and the outlet 34 are positioned at the center of the heat exchanger 12. A central location of both the inlet 32 and the outlet 34 can help ensure even distribution of heat and prevent one side or edge of the heat exchanger heating or cooling much faster than another side or edge. The central location of the inlet 32 and the outlet 34 can provide flexibility in connecting multiple heat exchangers 12 together.

The inlet 32 and the outlet 34 can each comprise main channels (i.e., larger diameter channels) that split in to a plurality of fractal channels 36. The fluid flowing through the channels 30 can enter the inlet 32 toward the center of the heat exchanger 12 flowing in a first direction. The direction of the fluid can then reverse and divide in half as the fluid flows through sub-channels 38. The fluid in each of the sub-channels 38 can then divide in half once again in secondary channels 40. After passing through the secondary channels 40, the direction of flow of the fluid can reverse again and the fluid can flow through the fractal channels 36 across the heat exchanger 12 in the same direction in which the fluid entered the inlet 32. The fluid can follow a similar, but opposite path, from the fractal channels 36 to the outlet 34.

As shown by FIG. 3A, in one or more implementations the channels 30 can have a symmetrical layout across the middle of the heat exchanger 12. In alternative implementations, the channels can be asymmetrical. Still further the inlet and/or outlet can be positioned near an edge of the heat exchanger 12. Furthermore, the channels 30 can optionally have a serpentine configuration (i.e., a single channel that winds around the heat exchanger 12. One will appreciate that while the foregoing listed alternative implementations may provide some advantages, they may not be as efficient as the implementation illustrated in FIG. 3A.

Thus, one will appreciate in light of the disclosure herein that the channels 30 of the heat exchanger 12 may not all have the same diameter. For example, the main channels of the inlet 32 and outlet 34 can have a diameter larger than that of the sub-channels 38. The sub-channels 38 in turn can have a larger diameter than the secondary channels 40 and the fractal channels 36. In one or more implementations, the diameter of the main channels of the inlet 32 and outlet 34 is twice as large as the diameter of the sub-channels 38, which in turn have a diameter that is twice as large as the fractal channels 36. In alternative implementations, all of the channels 30 have substantially the same diameter.

The channels 30 (and any tubes attached thereto) of the heat exchanger 12 can have a cross-section or shape that will allow for an efficient flow of fluid through the heat exchanger 12. For example, the channels 30 can have, but are not limited to, a D shape, half-circular shape, triangular shape, circular or round shape, a or semicircular shape. In at least one implementation the channels 30 have a circular cross-sectional shape.

FIG. 3A further illustrates that the heat exchanger 12 can further include an inlet tube 42 and an outlet tube 44. The inlet tube 42 and outlet tube 44 can feed and take heat exchange fluid to and from the heat exchanger 12. The heat exchange fluid can comprise, but is not limited to, water, ethylene glycol, or other suitable fluid for the purpose of transferring thermal energy into or out of adjoining thermal panels. When metal is used to manufacture the modular thermal panels 10, a closed loop system for the transfer of thermal energy to or from a potable water system may be used. The heat exchange fluid may, but is not required to have, anti-corrosion properties. Where a system is susceptible to freezing temperatures, the heat exchange fluid can comprise an anti-freeze solution such as, but not limited to glycol.

In at least one implementation the inlet and outlet tubes 42, 44 can each have a curved configuration as shown in FIG. 3A. The curved or bent configuration can provide more flexibility and adjustability in the connection between panel units. In at least one implementation, the inlet and outlet tubes 42, 44 are bent such that the opposing ends of the inlet and outlet tubes 42, 44 (i.e., the ends not connected to the heat exchanger 12) are oriented at approximately 90 degrees relative to the inlet 32 and outlet 34 of the heat exchanger 12. In alternative implementations, the inlet and outlet tubes 42, 44 are straight or flexible.

Figure 3B:
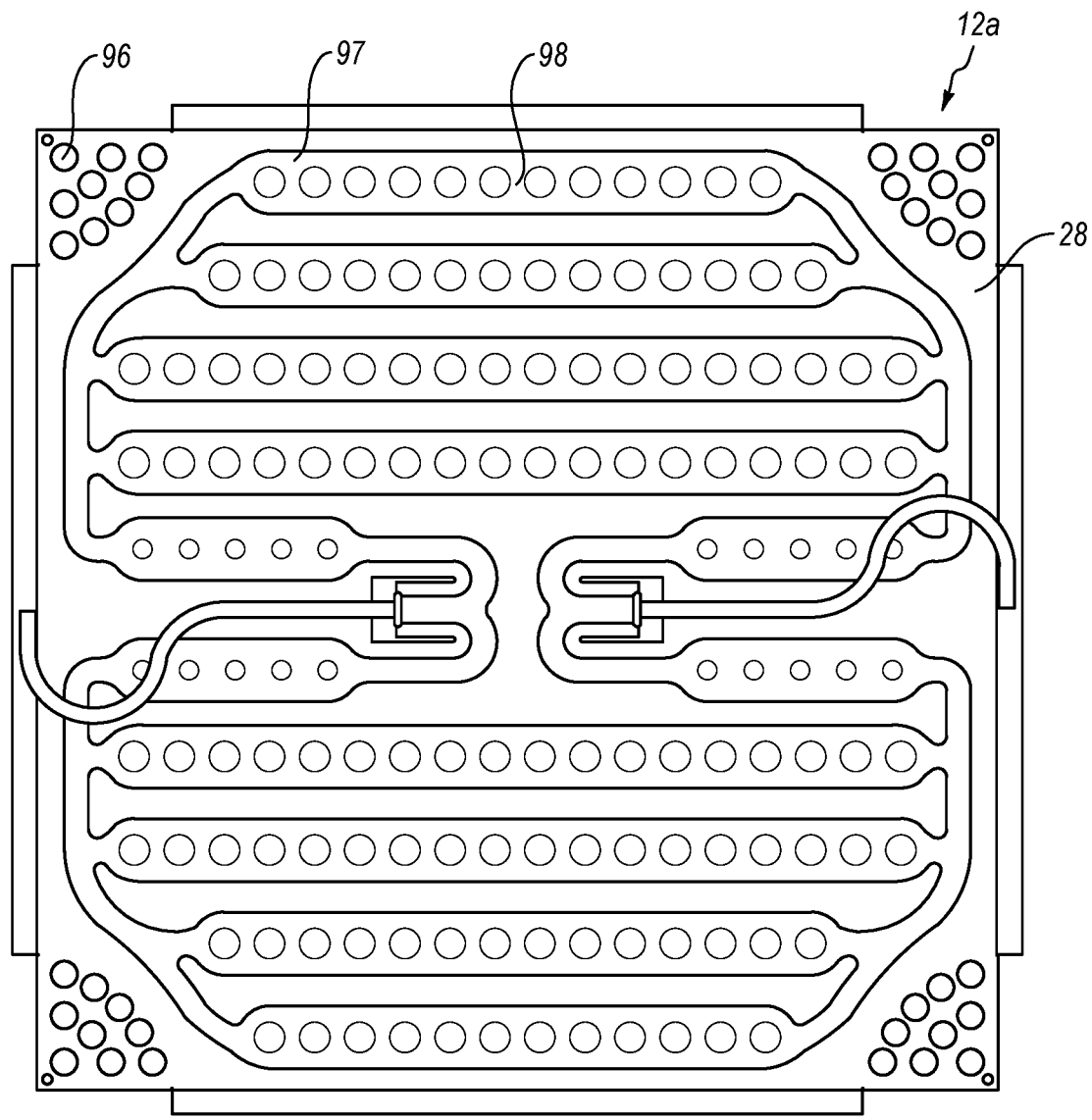
FIG. 3B is a bottom plan view of another implementation of a roll bonded heat exchanger in accordance with one or more implementations of the present invention.
Figure 3C:
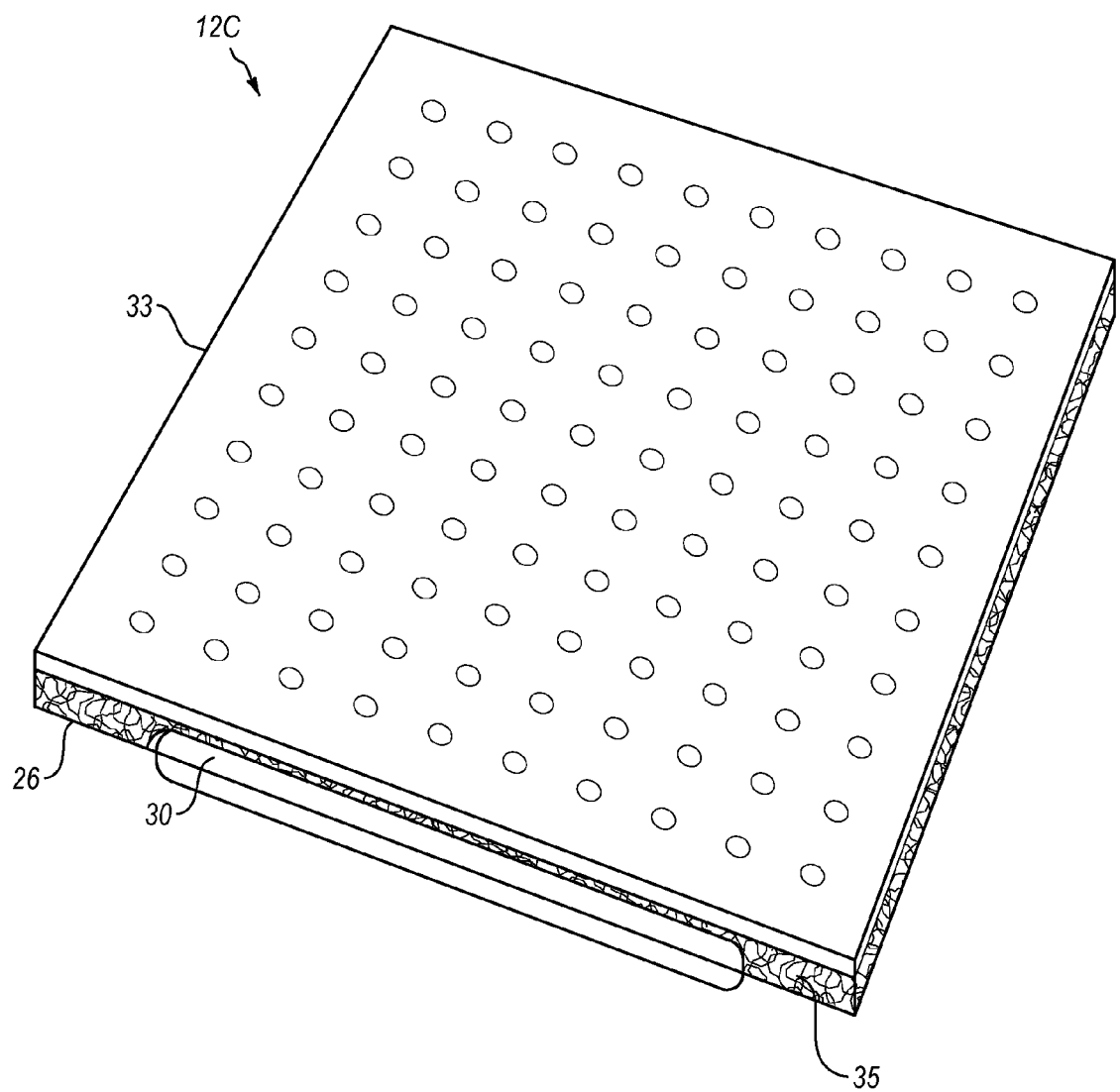
FIG. 3C is a bottom perspective view of a thermal panel configured as an acoustic ceiling tile in accordance with one or more implementations of the present invention.

FIG. 3B further illustrates another implementation of a heat exchanger 12a similar to that of FIG. 3A, albeit that the heat exchanger 12 includes raised support elements 96 that provide support for the thermal mass unit in areas where there are no raised channels 30 to provide support. These raised support elements 96 can have a top surface equal in elevation to the top surface of the raised channels 30. The raised support elements 96 can protrude on the second panel 28. FIG. 3B further illustrates that the sub channels 97 can be connected with cross channels 98 to create a balancing effect between the channels and to create turbulent flow adding to the efficient transfer of thermal energy between the thermal transfer fluid and the channel walls.

Figure 4A:
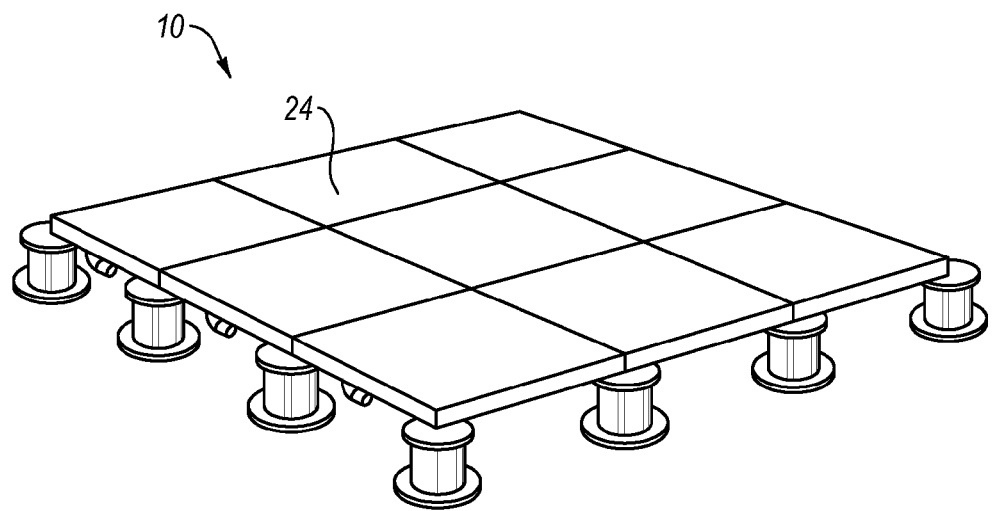
FIG. 4A is a top perspective view of an array of nine thermal panels mounted on pedestals in accordance with one or more implementations of the present invention.
Figure 4B:
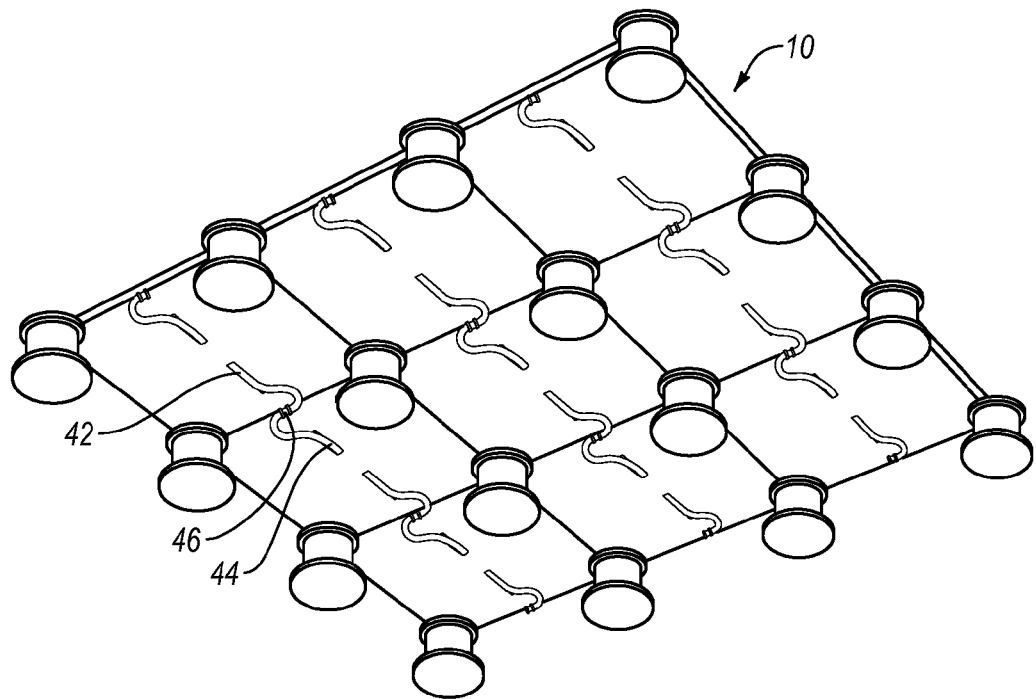
FIG. 4B is a bottom perspective view of the array of nine thermal panels of FIG. 4B.

The inlet and outlet tubes 42, 44 can allow one to connect multiple modular thermal panels 10 together. For example, FIGS. 4A and 4B illustrate top and bottom view of an array of nine modular thermal panels 10. Thus, individual modular thermal panels 10 can create rows of the modular thermal panels 10. One will appreciate that the modularity (e.g., size, connect ability) can allow for arrays with any number of different configurations. Further, the rows can couple to supply and return tubes via a manifold, to form an array. The supply and return tubes may route and attach to an object, such as but not limited to a heat exchanger, a water heater, chiller, geothermal loop, solar panel, swimming pool circulation loop, fountain, boiler, under water pipe loop or septic system loop.

An outlet tube 44 of one modular thermal panel 10 is coupled to an inlet tube 42 of an adjacent modular thermal panel 10. As shown by FIG. 4B, the curved or bent configuration of the inlet and outlet tubes 42, 44 can create an "s" shaped configuration. More specifically, a connector 46 can couple the inlet and outlet tubes 42, 44 together.

Figure 5:
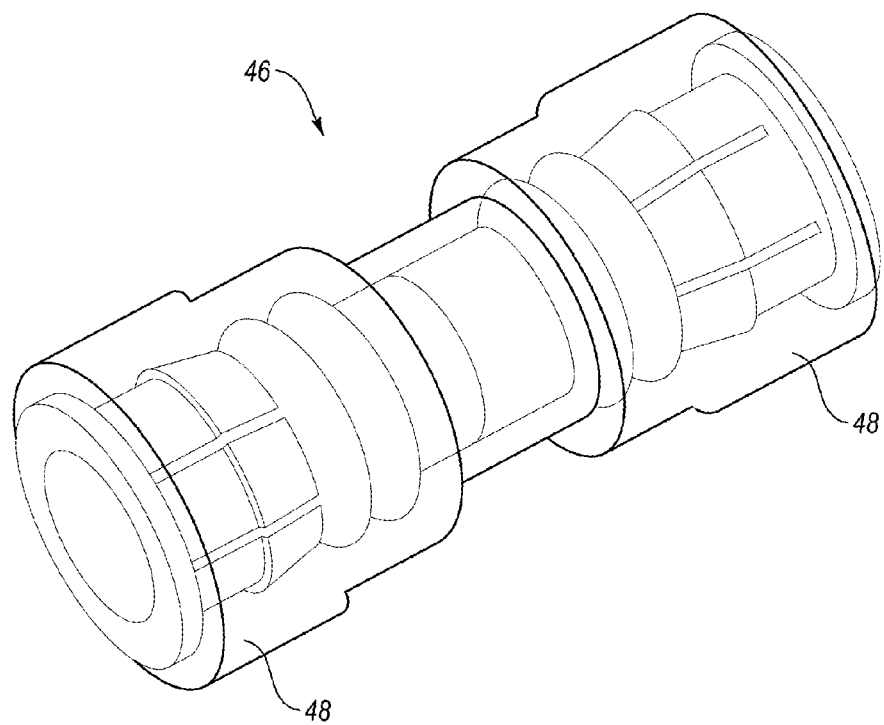
FIG. 5 is a partial cut away perspective view of a double O-ring connector in accordance with one or more implementations of the present invention.

As illustrated by FIG. 5, the connector 46 can comprise a push-on leak proof connector. The connector 46 can comprise double O-rings, single O-rings, or b-rings. Additionally, the connector 46 can optionally include a locking collet 48 at each end. Alternatively, the connector 46 can comprise a union connector, a friction-fit connector, a soldered connector, a brazed connector, or a welded connector. In any event, in one or more implementations, the connector 46 can allow for the disassembly of modular thermal panels 10, without causing damage to the inlet and outlet tubes 42, 44. For applications that require a flexible, non-damaging, removable-connection, such as when used in conjunction with pavers and pedestals, the connectors 46 can comprise female by female, non-flow restricting push-on fittings or connectors.

In alternative implementation, such as when used with permanent, well supported applications such as under poured concrete, or on a sub-floor, the connector 46 can comprise another type of connector. The connectors 46 can comprise materials such as, but not limited to, plastic, brass, stainless steel, bronze, copper, rubber. In at least one implementation, the connector 46 can comprise plastic due to its low cost and resistance to corrosion. The O-rings may comprise a material suitable to the intended temperature range, chemical exposure and life expectancy for each application. In one or more implementations, the connector 46 is one piece unit with a thermoplastic elastomer in place of an O-ring to create a waterproof seal.

Figure 6:
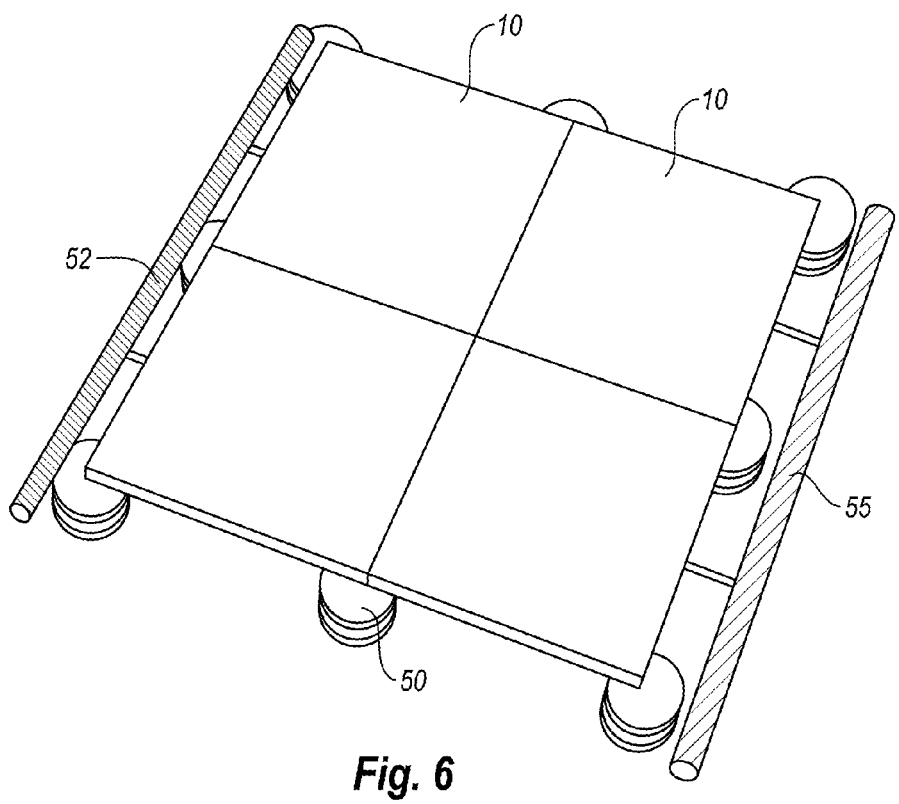
FIG. 6 is a perspective view of an array of four thermal panels mounted on corner pedestals with the cold fluid inlet conduit on the right side and the hot fluid output conduit on the left side of the array in accordance with one or more implementations of the present invention.

Referring to FIG. 6, there shown is a perspective view of an array of four modular thermal panels 10 mounted on corner pedestals 50. The array is connected to a cold fluid inlet conduit 52 on one side and a hot fluid output conduit 55 on the other side of the array. In use, in hot weather, a pump may send heat transfer fluid from the conduit 52 on one side of the array of thermal panels, through the array of panels to heat the fluid and cool the paver surface. The fluid may then flow to the conduit 55 on the other side of the array of thermal panels. The heated fluid in the conduit 55 may then flow a heat exchanger to warm water in a pool. Thus, the surface of the architectural tiles (e.g., pavers) is kept cool and comfortable for walking while, at the same time, solar energy is being used to warm water in a pool. This process can cool a pool in hot climates in the evening by transferring heat from the pool water to the cool paver surface. In the winter time the flow of fluid through the thermal panels can reverse where warm or heated fluid such as an anti-freeze heat transfer fluid that is heated from a geothermal system is pumped through the thermal panels to melt snow or ice on the surface of the panels by warming the thermal panels.

Figure 7:
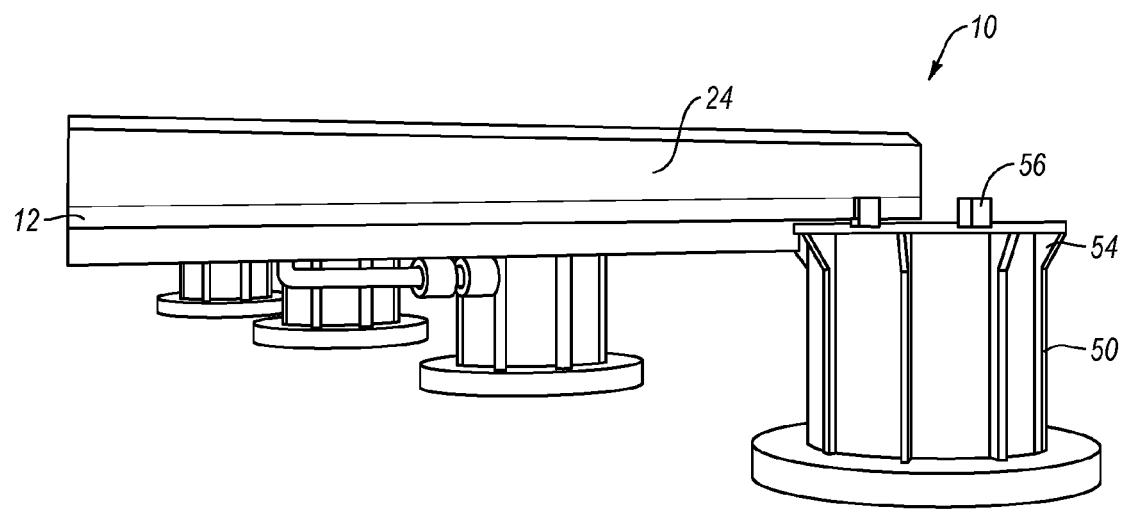
FIG. 7 is a side elevation view of an array panels mounted on pedestals with alignment tabs in accordance with one or more implementations of the present invention.

FIG. 7 illustrates a side elevation view of an array of modular thermal panels 10 attached to pedestals 50. In alternative implementations, the modular thermal panels 10 may be set on a bed of sand or another surface. The pedestals 50 may rest on a support base of concrete, sand, quarry dust, etc. As depicted, height adjustable pedestals 50 support heat exchanger 12 and architectural tile 24 and provide sufficient space between and ground for piping. By adjusting the height of the pedestals 50, the present invention can be applied to uneven ground or slope. Each heat exchanger 12 couple to and adjacent other heat exchanger via connectors.

Figure 8:
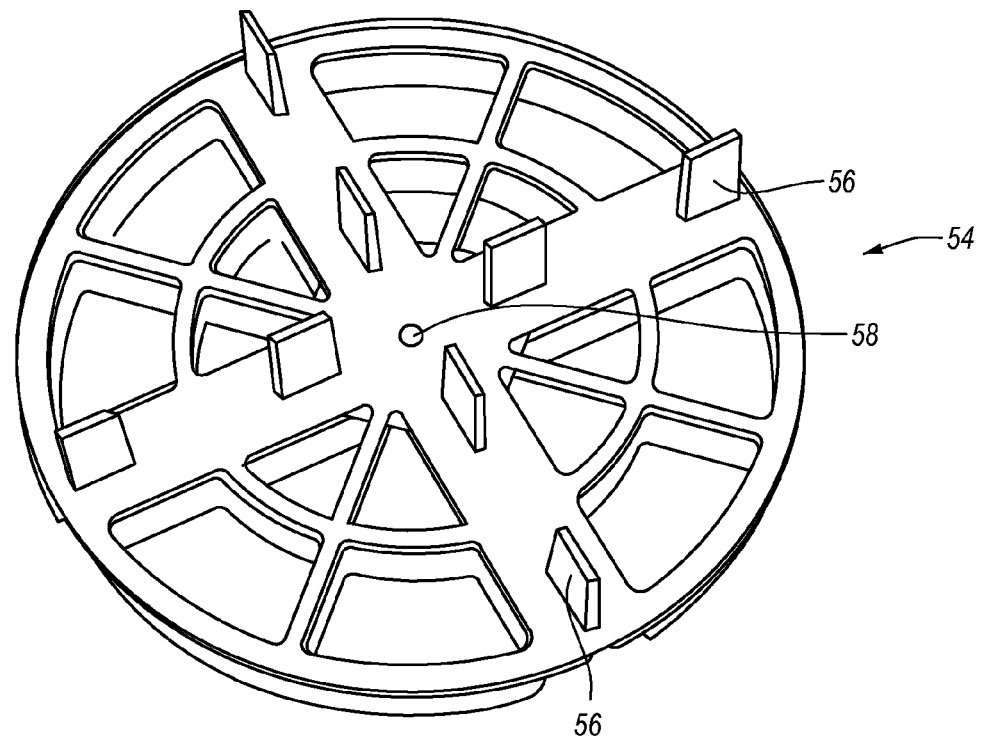
FIG. 8 is a top perspective view of an alignment ring with spacing tabs for four thermal pavers in accordance with one or more implementations of the present invention.

As shown by FIG. 7, the pedestals 50 can optionally include a corner alignment ring 54. Using vertical tapered tabs 56, the corner alignment ring 54 can align up to four corners of modular thermal panels 10 to form an array. For example, FIG. 8 illustrates a top view of one implementation of a corner alignment ring 54. As shown by FIG. 8, the corner alignment ring 54 can include vertical tapered tabs 56 that provide proper alignment of the modular thermal panels 10 or architectural tiles 24. The corner alignment ring 54 can comprise any number of suitable materials including, but not limited to, polymers, stainless steel, copper, aluminum, or rubber. The corner alignment ring 54 can further include weep holes to allow water to drain out. In addition to the foregoing, the corner alignment ring 54 can include grooves molded into the horizontal plate to allow for easy cutting of the pedestals into halves or quarters.

The corner alignment ring 54 can provide tapered vertical tabs 56 on the top surface to provide the proper spacing between multiple thermal panels. The corner alignment ring 54 can also provide a solid support for the corners of the modular thermal panels 10. Furthermore, the corner alignment ring 54 can sit on and align with most commonly used pedestal supports. In particular, the corner alignment ring 54 can also include a center boss with a pre-formed hole 58 for receiving a fastener which allows the corner alignment ring 54 to be fastened mechanically to a pedestal 50 or substrate.

Figure 9:
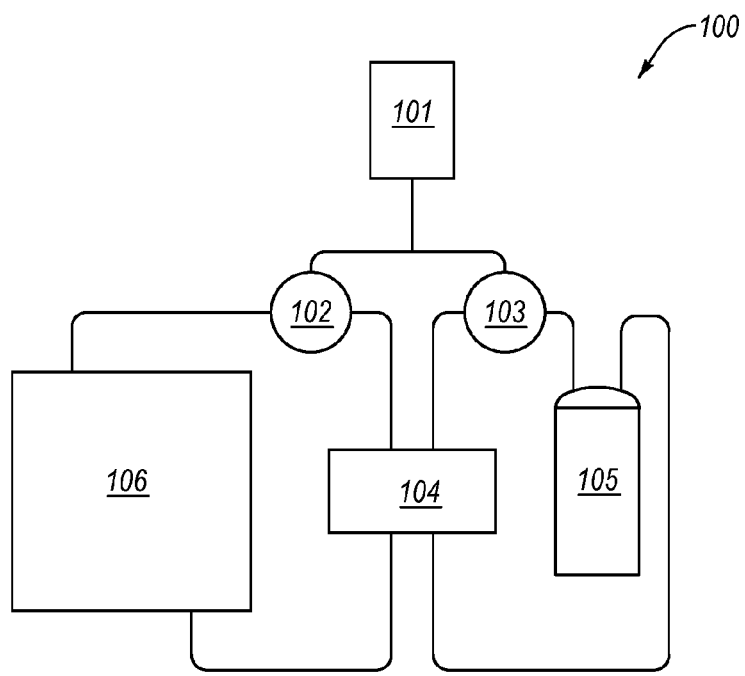
FIG. 9 illustrates a system diagram of an example heat exchange system for space cooling in accordance with an implementation of the present invention.

As alluded to earlier, the modular thermal panels 10 of the present invention may form part of a heat exchange system for space cooling. For example, FIG. 9 illustrates a schematic diagram of an implementation of a heat exchange system 100. As shown, the heat exchange system 100 can include a PV solar collector 101, a first pump 102, a second pump 103, a secondary heat exchanger 104, a storage tank 105, and modular thermal panels 106. PV solar collector 701 can supply power to the first and second pumps 102, 103.

The first pump 102 can pump a heat exchanger fluid through the modular thermal panels 106. The heat exchanger fluid can absorb heat from architectural tiles placed on modular thermal panels 106. The heat exchange fluid can then exchange the thermal energy with another fluid in the secondary heat exchanger 104.

The second pump 103 can pump a fluid from the storage tank 105 to the secondary heat exchanger 104. At the secondary heat exchanger 104 the fluid can absorb thermal energy from the heat exchange fluid. Thus, in essence, modular thermal panels 106 can heat the water (or other fluid) in storage tank 105. The heat stored in storage tank 105 can be later used to save energy.

In alternative implementations, a heater or other heat source can replace the storage tank 105 to allow for radiant space heating. For example, the heater can be an electrical heater, solar hot water system, a coil filled with heat exchange fluid buried underground using terrestrial heat, or storage tank. In such implementations, the fluid circulated by the second pump 103 can transfer thermal energy to the heat exchanger fluid at the secondary heat exchanger 104. The heated thermal exchanger fluid can then provide heat to architectural tiles placed on the modular thermal panels 106 to melt snow or prevent ice accumulation. The heated exchange fluid can also be used to heat acoustic ceiling tiles for interior radiant heating.

Figure 10:
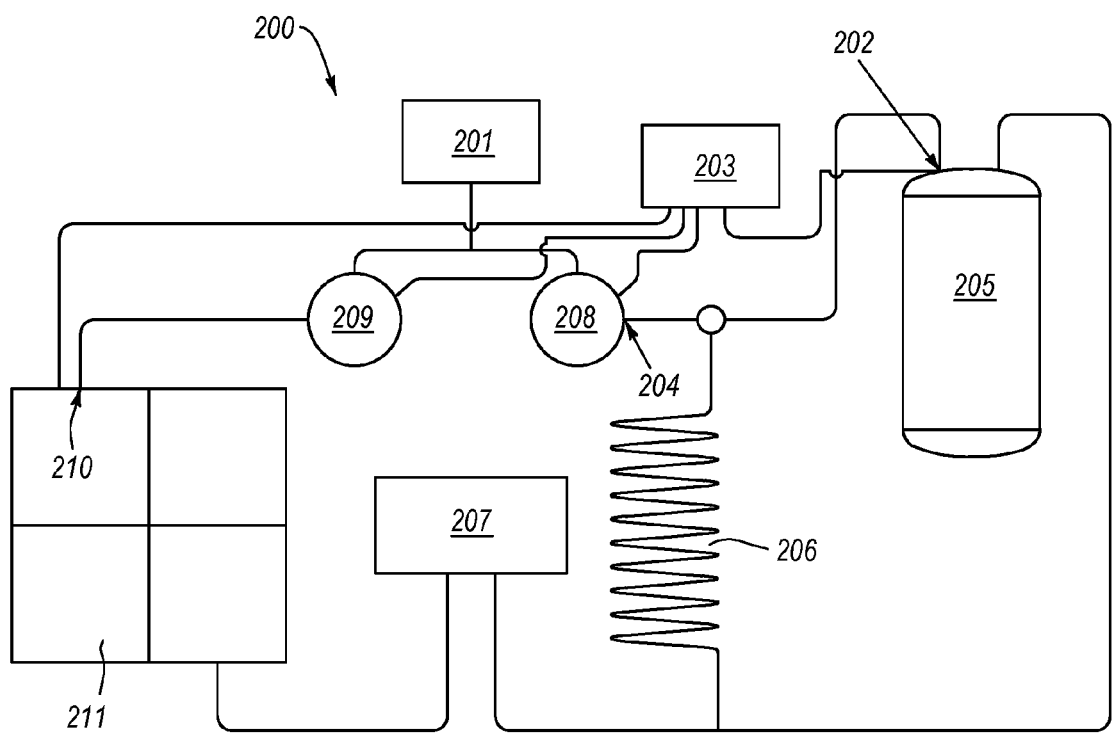
FIG. 10 illustrates a system diagram of an example thermal/PV collection system in accordance with an implementation of the present invention.

FIG. 10 illustrates a system diagram of one implementation of a thermal/PV collection system. Thermal/PV collection system 200 can include a power supply 201, a first pump 209, a second pump 208, a controller 203, a first thermal sensor 210, a second thermal sensor 202, a valve 204, a heat source 206, a storage tank 205, a secondary heat exchanger 207, and a combination thermal/PV array 211. Combination thermal/PV array 211 can include a series of PV cells with multiple modular thermal panels attached to the back side. Combination thermal/PV array 211 can be the primary power supply of pump 209 and pump 208. A target temperature range can be preset.

In the case of collecting thermal energy from combination thermal/PV panel array, the controller 203 can switch the valve 204 to storage tank 205 and measures the temperature differential based on thermal sensor 202 and thermal sensor 210. When the temperature falls inside the target temperature range, controller 203 can turn on pump 208 and pump 209 so that the PV cells can be cooled down in summer and the modular thermal panels can collect thermal energy.

For purpose of heating the PV cells to melt the snow in winter, controller 203 can switch valve 204 to heat source 206. In the case that the pump 209 and pump 208 may not be able to receive enough power because electrical power because the PV cells are covered by snow, power supply 201 can provide backup power. Controller 203 also measures the temperature differential based on thermal sensor 202 and thermal sensor 210. When the temperature falls inside the target temperature range, controller 203 can turn on pump 208 and pump 209 so that the PV cells can be heated to remove the snow in winter.

Figure 11:
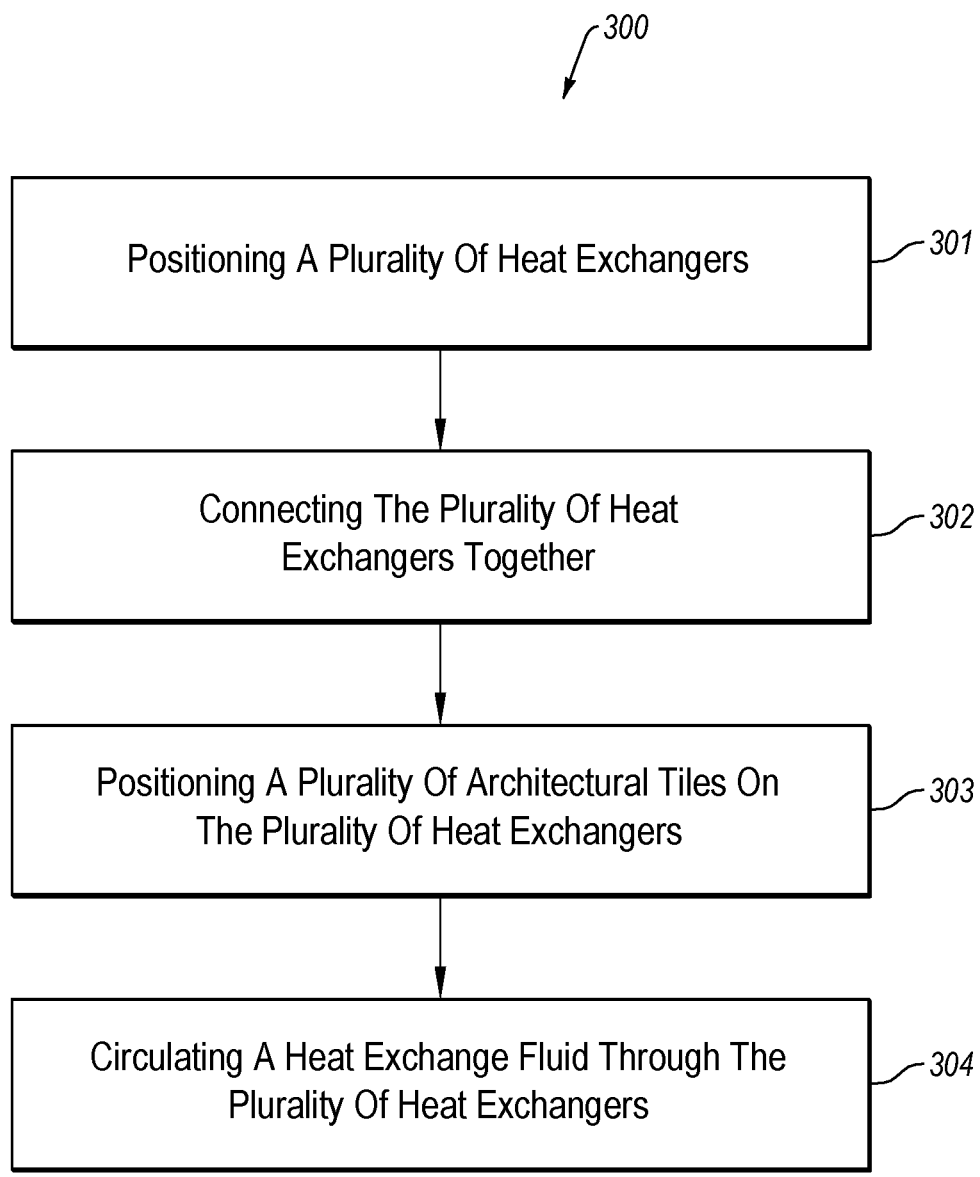
FIG. 11 illustrates a flow chart of an example method for collecting and utilizing thermal energy in accordance with an implementation of the present invention.

Accordingly, FIGS. 1-10, the corresponding text, provide a number of different components and mechanisms for collecting and transferring thermal energy in an efficient, aesthetically pleasing way. In addition to the foregoing, implementations of the present invention can also be described in terms of flowcharts comprising acts and steps in a method for accomplishing a particular result. For example, FIG. 11 illustrates a flowchart of one exemplary method for collecting and utilizing thermal energy using principles of the present invention. The acts of FIG. 11 are described below with reference to the components and diagrams of FIGS. 1 through 10.

For example, FIG. 11 shows that a method 300 of collecting and utilizing thermal energy involve an act 301 of positioning a plurality of heat exchangers 12. For, act 301 can involve placing a plurality of pedestals 50 on a surface. Act 301 can involve identifying a layout pattern for multiple panels. The layout pattern may be printed on the multiple panels and may be any type pattern including fractal patterns and spiral patterns. Act 301 can optionally further involve placing an alignment ring 54 on each pedestal 50. Act 301 can further involve adjusting the height of one or more of the pedestals 50 and placing the corners of the heat exchangers 12 on top of the pedestals 50 using the alignment rings 54. Alternatively, act 301 can involve placing the heat exchanger 12 on sand or other surface.

The method 300 can further involve an act 302 of connecting the plurality of heat exchangers together. In particular, act 302 can involve using a connector 46 to secure an inlet tube 42 of one heat exchanger 12 to an outlet tube 44 of another heat exchanger 12. For example, act 302 can involve connecting an inlet tube 42 to an outlet tube such that the connector 46 is oriented an angle relative to the inlet 32 and outlet 34 of the heat exchangers 12.

FIG. 11 further illustrates that the method 300 can involve an act 303 of positioning a plurality of architectural tiles on the plurality of heat exchangers. For example, act 303 can involve placing an architectural tile 24 (e.g., roofing tiles, floor tiles, pavers, flag stones, or decking) on a flat upper surface of each heat exchanger 12. Act 303 can also optionally involve applying a layer of thermal conductive material to fill gaps between the plurality of architectural tiles 24 and the plurality of heat exchangers 12.

The method 300 can also involve an act 304 of circulating a heat exchange fluid through the plurality of heat exchangers. For example, act 304 of pumping water or glycol through a plurality of channels 30 in the heat exchanger 12. The heat exchanger fluid can enter an inlet 32 of a heat exchanger 12 near it center and flow through fractal channels 36 to an outlet 34 near the center of the heat exchanger 12.

In addition, the modularity design provides convenience in replacing the architectural tiles 24. After resting architectural tiles 24 directly against the heat exchanger(s) 12, if a problem is identified in one of the architectural tiles 24, the problematic architectural tiles 24 can be simply replaced by a second architectural tiles 24. The architectural tiles 24 can be any architectural components including tiles, pavers, and wood floors.

The modular nature of the invention provides for expansion and contraction between the thermal panels as they heat and cool over a wide spectrum of temperatures. Furthermore, the modular thermal panels allow a user to easily install, repair, or replace them. The modular thermal panels are usable with paver/slabs that are elevated on pedestals or with roofing ballast tiles. The modular thermal panels also allow a user to easily dismantle them and reassemble them to allow for underlying roof/substrate repairs. When used in an exterior application, the modular thermal panels can become an invisible solar collector array, thus allowing for solar collection of energy where conventional exposed solar collectors are not suitable or allowed for aesthetic or practicality reasons.

Further it should be noted that one or more implementations of the present invention provides for multiple use applications, such as, but not limited to: (a) solar gain to heat domestic hot water in warm weather, switchable to snow melt in the winter months; (b) solar gain up to the capacity of the storage medium then switching to a geo thermal loop for cooling of the attached thermal mass; (c) using a geo thermal loop to cool the thermal mass in hot weather and to snow melt the thermal mass in the winter; (d) heat domestic water while cooling the roof to help reduce the urban heat island effect in cities thus potentially qualifying for "cool roof" status or LEED points where required or desired; (e) add a water chiller unit into the loop to add additional cooling to the thermal mass to cool patios, swimming pool patios, or roof top patios, in high heat environments; (f) use in applications that require a cool or hot space without the mechanically induced movement of air.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A modular thermal panel configured to be placed against an architectural tile to absorb heat from or transfer heat to the architectural tile, comprising:
   a heat exchanger having two separate panels including a first panel connected to a second panel, the top surface of the first panel being configured to abut the architectural tile, the bottom surface of the first panel being configured to abut the top surface of the second panel, the first and second panels each having corresponding channels formed therein;
   a plurality of channels defined by the shape of the channels in the first panel and in the second panel, the plurality of channels allowing a heat exchange fluid to pass through the first and second panels and transfer heat to or from the architectural tile, the shape of the channels being formed to increase a fluid flow rate through the heat exchanger and to lessen a pressure drop across inlets and outlets;
   an inlet of the plurality of channels of the heat exchanger; and
   an outlet of the plurality of channels;
   wherein:
   the inlet and the outlet are positioned near the center of a surface of the heat exchanger to provide even heat distribution and to provide increased flexibility in connecting multiple heat exchangers together;
   the inlet and outlet attach to the modular thermal panel without extending inside the plurality of channels; and
   a tube is connected to the inlet or the outlet on one side, and extends along the surface of the heat exchanger toward an outside edge thereof, the tube further extending within a plane that is parallel to the surface of the heat exchanger.

2. The modular thermal panel as recited in claim 1, wherein the plurality of channels comprise:
   a first main channel coupled to the inlet;
   a second main channel coupled to the outlet; and
   a plurality of sub channels connected between the first main channel and the second main channel.

3. The modular thermal panel of claim 1, wherein the heat exchanger is made of a thermally transmissive material comprising one or more of polymers, steel, aluminum, and copper.

4. The modular thermal panel of claim 1, further comprising an insulator panel abutting the second panel of the heat exchanger, the insulator panel having one or more selectively removable corners that selectively allow corners of the heat exchanger to be exposed.

5. The modular thermal panel of claim 4, further comprising a pedestal having a corner alignment ring, wherein a corner of the heat exchanger is coupled to the pedestal and abuts against the corner alignment ring.

6. The modular thermal panel of claim 1, wherein the inlet and outlet are located away from the edges of the first and second panels.

7. The modular thermal panel of claim 1, further comprising:
a membrane secured to the first panel of the heat exchanger;
wherein the membrane is configured to provide a thermal connection between the abutting heat exchanger and architectural tile without bonding the heat exchanger to the architectural tile.

8. The modular thermal panel of claim 7, wherein the membrane comprises a non-hardening thermal mastic paste.

9. The modular thermal panel of claim 7, wherein the membrane further comprises a sound dampening material.

10. The modular thermal panel of claim 7, wherein the membrane further comprises metal fibers or metal wool.

11. The modular thermal panel of claim 1, wherein the architectural tiles comprises a ceiling tile.

12. The modular thermal panel as recited in claim 1, wherein the plurality of channels defined by the first panel and the second panel are disposed between the first panel and the second panel.

13. The modular thermal panel of claim 1, wherein:
the plurality of channels comprise a tubular shape defined by corresponding, overlapping semi-circular shapes in the first panel and in the second panel; and
the first panel and second panel comprise bonded thermoplastic materials.

14. A heat transfer system for transferring, heating, or cooling a plurality of architectural tiles, comprising:
a plurality of heat exchangers, each heat exchanger of the plurality of heat exchangers comprising:
first and second panels intermittently positioned together to define a plurality of channels configured to allow the flow of heat exchange fluid without the use of tubing within the channels;
wherein a top surface of the first panel is configured to abut at least one of the plurality of architectural tiles, and the plurality of channels are further defined in relative size in the first panel and in the second panel to increase a fluid flow rate through the heat exchanger and to lessen a pressure drop across inlets and outlets;
an inlet and an outlet to the plurality of channels, wherein the inlet and outlet are near a center of a top or bottom surface of the first and second panels of the heat exchanger to provide even heat distribution and to prevent one area of the heat exchanger from heating or cooling much faster than another area thereof, and further to provide increased flexibility in connecting multiple heat exchangers together;
a plurality of architectural tiles positioned on the first panels of the plurality of heat exchangers so as to conceal the plurality of heat exchangers from view; and
a heat exchange fluid configured to flow through the plurality of channels of the plurality of heat exchangers to transfer heat between the heat exchange fluid and the plurality of architectural tiles; and
a tube extending from the inlet or outlet in an S-shape configuration, wherein the tube extends along a top or bottom surface of the first heat exchanger from the center thereof toward an outer edge thereof, and within a plane that that is parallel to the surface of the first heat exchanger and a corresponding top or bottom surface of the second heat exchanger.

15. The heat transfer system as recited in claim 14, further comprising:
an outlet tube attached to the outlet of each heat exchanger; and
an inlet tube attached to the inlet of each heat exchanger;
wherein the outlet tube and inlet tube attach to the heat exchanger without being inserted inside the plurality of channels.

16. The heat transfer system as recited in claim 15, wherein at least one of the inlet and outlet tubes are bent such that a bent portion is oriented at least 90 degrees to the inlets and outlets of the heat exchangers.

17. The heat transfer system as recited in claim 14, further comprising:
a secondary heat exchanger coupled to the plurality of heat exchangers; and
a water tank connected to the secondary heat exchanger.

18. The heat transfer system as recited in claim 14, further comprising a plurality of pedestals supporting corners of the plurality of heat exchangers.

19. The heat transfer system as recited in claim 14, wherein the architectural tiles comprise one or more of pavers, concrete slabs, ceiling tiles, or roofing tiles.

20. The heat transfer system as recited in claim 14, wherein:
the plurality of heat exchangers comprise bonded thermoplastic first and second panels intermittently positioned to define the plurality of channels between the first and second panels.

21. The heat transfer system as recited in claim 14, wherein:
the plurality of channels comprise a tubular shape defined by a set of grooves formed in the first panel and a corresponding set of overlapping grooves formed in the second panel
wherein the overlapping grooves of the first and second panels cooperate to conduct heat transfer fluid without the use of a tube positioned therein.

22. The heat transfer system as recited in claim 14, further comprising:
a membrane positioned between the plurality of architectural tiles and the first panels of the plurality of heat exchangers;
wherein the membrane comprises a non-hardening paste that increases friction between the plurality of architectural tiles and the first panels of the plurality of heat exchangers without providing a bond therebetween.

23. A method of collecting and utilizing thermal energy, comprising:
positioning a plurality of heat exchangers across a surface;
interconnecting the plurality of heat exchangers together, including at least a first and second heat exchanger, wherein each heat exchanger of the plurality of heat exchangers comprises two separate panels including first and second panels intermittently positioned together to define a plurality of channels, wherein the top surface of the first panel is configured to abut an architectural tile, the bottom surface of the first panel being configured to abut the top surface of the second panel;
wherein the plurality of channels formed therein are shaped to create turbulent flow of the fluid for enhanced flow of energy from the thermal fluid to the first and second panels, and to increase a fluid flow rate through the heat exchanger and to lessen a pressure drop across inlets and outlets, and an inlet and an outlet to the plurality of channels;
connecting a curved tube to an inlet positioned near a center of the bottom or top surface of the first heat changer, and connecting another end of the curved tube to an outlet near a center of the corresponding bottom or top surface of the second heat exchanger, wherein the curved tube aligns with the corresponding top or bottom surfaces of the first and second heat exchangers to which the curved tube is attached, and within a plane that is parallel to the corresponding top or bottom surfaces of the first and second heat exchangers;

wherein connecting the first and second heat exchangers at the center of the corresponding first and second heat exchangers, rather than at an edge thereof, enables even heat distribution and provides increased flexibility in connecting multiple heat exchangers together;

positioning a plurality of architectural tiles on the first panels of the plurality of heat exchangers so as to conceal the plurality of heat exchangers from view; and circulating a heat exchange fluid through the plurality of channels of the plurality of heat exchangers without the use of a tube within the plurality of channels, thereby causing heat to transfer between the plurality of architectural tiles and the heat exchange fluid.

24. The method as recited in claim 23, further comprising:
placing a plurality of pedestals on the surface, each of the plurality of pedestals having an alignment ring;
adjusting the height of the plurality of pedestals;
placing the plurality of heat exchangers on top of the plurality of pedestals;
adjusting the alignment rings to prevent sliding of the plurality of heat exchangers; and
applying a layer of thermal conductive material to fill gaps between the plurality of architectural tiles and the plurality of heat exchangers.

25. The method as recited in claim 23, further comprising:
assembling an insulating surface to a first heat exchanger;
connecting a second heat exchanger to the first heat exchanger;
resting the plurality of architectural tiles directly against each of the first and second heat exchangers;
identifying a problem with one of the architectural tiles; and
replacing the problematic architectural tile with another architectural tile without disconnecting or moving the first and second heat exchangers.

26. The method as recited in claim 23, further comprising:
connecting the plurality of heat exchangers to one or more pumps;
detecting a temperature differential between an inlet tube and an outlet tube;
turning on the one or more pumps when the temperature differential falls inside a determined temperature range, and
turning off the one or more pump when the temperature differential falls outside the determined temperature range.

27. The method as recited in claim 23, further comprising:
positioning a membrane between one or more of the plurality of heat exchangers and an architectural tile;
wherein the membrane increases friction between the one or more heat exchangers and corresponding architectural tile without forming a bond therebetween.

* * * * *